United States Patent
Zhang (10) Patent No.: US 11,454,848 B2
(45) Date of Patent: Sep. 27, 2022

(54) POWER-ON CARRYING APPARATUSES AND ALIGNMENT ULTRAVIOLET LIQUID CRYSTAL IRRADIATION DEVICES

(71) Applicants: HKC CORPORATION LIMITED, Shenzhen (CN); CHONGQING HKC OPTOELECTRONICS TECHNOLOGY CO., LTD., Chongqing (CN)

(72) Inventor: Zijian Zhang, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 676 days.

(21) Appl. No.: 16/330,895

(22) PCT Filed: Nov. 29, 2018

(86) PCT No.: PCT/CN2018/118205
§ 371 (c)(1),
(2) Date: Mar. 6, 2019

(87) PCT Pub. No.: WO2020/082504
PCT Pub. Date: Apr. 30, 2020

(65) Prior Publication Data
US 2021/0333643 A1    Oct. 28, 2021

(30) Foreign Application Priority Data
Oct. 23, 2018 (CN) .......................... 201811237735.0

(51) Int. Cl.
*G02F 1/1337* (2006.01)
*G02F 1/13* (2006.01)

(52) U.S. Cl.
CPC ...... *G02F 1/133788* (2013.01); *G02F 1/1303* (2013.01)

(58) Field of Classification Search
CPC .................. G02F 1/133788; G02F 1/1303
See application file for complete search history.

(56) References Cited

FOREIGN PATENT DOCUMENTS

| CN | 104391386 A | 3/2015 |
|---|---|---|
| CN | 106324909 A | 1/2017 |

(Continued)

OTHER PUBLICATIONS

International Search Report and Written Opinion (English translation) issued in International Application No. PCT/CN2018/118205, 6 pages.

*Primary Examiner* — Donald L Raleigh
(74) *Attorney, Agent, or Firm* — Dorsey & Whitney LLP (57) ABSTRACT

This application discloses a power-on carrying apparatus, configured to carry a power-on probe to power on a display substrate. The power-on carrying apparatus includes a base and a carrying mechanism. The carrying mechanism is arranged on the base and may move relative to a power-on contact of the display substrate. The carrying mechanism is configured to carry the power-on probe, and the power-on probe is detachably fixed on the carrying mechanism to be electrically connected to the display substrate. This application further discloses an alignment ultraviolet liquid crystal irradiation device having the foregoing power-on carrying apparatus.

11 Claims, 4 Drawing Sheets

(56) References Cited

FOREIGN PATENT DOCUMENTS

| CN | 107037636 A | * | 8/2017 | ............ | G02F 1/1337 |
| CN | 108008580 A | * | 5/2018 | ............ | G02F 1/1303 |
| KR | 20100042587 A | | 4/2010 | | |
| WO | WO-2015040664 A1 | * | 3/2015 | ............ | G02F 1/1303 |

* cited by examiner

FIG. 7

POWER-ON CARRYING APPARATUSES AND ALIGNMENT ULTRAVIOLET LIQUID CRYSTAL IRRADIATION DEVICES

CROSS REFERENCE TO RELATED APPLICATIONS

This application is a U.S. National Stage of PCT Application No. PCT/CN2018/118205 filed on Nov. 29, 2018, which claims priority to China Patent Application No. 201811237735.0, filed on Oct. 23, 2018 and entitled "POWER-ON CARRYING APPARATUSES AND ALIGNMENT ULTRAVIOLET LIQUID CRYSTAL IRRADIATION DEVICES", which are hereby incorporated by reference in their entirety.

TECHNICAL FIELD

This application relates to the technical field of displaying, and in particular, to a power-on carrying apparatus and an alignment ultraviolet liquid crystal irradiation device.

BACKGROUND

In the technical field of displaying, in a production and manufacturing process of a display panel, an alignment ultraviolet liquid crystal irradiation device is generally required to align a liquid crystal product through ultraviolet light during production of the liquid crystal product. A manufacture procedure part of general alignment ultraviolet liquid crystal irradiation devices is divided into an illumination apparatus and a power-on carrying apparatus. As different products have different designs of power-on contacts, it is necessary to replace power-on carrying apparatuses matched with the different products according to the power-on contacts of the different products during alignment of the different products, but the illumination apparatus is not required to be replaced. Generally, an operation procedure of a switching line of the power-on carrying apparatus switching line mainly includes: replacement of the power-on carrying apparatus, voltage measurement, and point location confirmation of the power-on contact. It takes 1.5 h for two persons to complete a switching line of a single alignment ultraviolet liquid crystal irradiation machine at each time. Only a power-on probe and a power connector part configured to supply power to the power-on probe in the power-on carrying apparatus require to be matched with different corresponding products, and the rest parts in all power-on carrying apparatuses are the same. However, during the replacement of the power-on carrying apparatus, the whole power-on carrying apparatus is replaced, causing waste of a great deal of time and waste of labor and cost.

SUMMARY

This application provides a power-on carrying apparatus, and aims to resolve the problems of waste of a great deal of time and waste of labor and cost caused by replacement of a power-on carrying apparatus.

In an aspect, this application provides a power-on carrying apparatus, configured to carry a power-on probe to power on a display substrate. The power-on carrying apparatus comprises:

a base; and a carrying mechanism, arranged on the base and capable of moving relative to a power-on contact of the display substrate, wherein the carrying mechanism is configured to carry the power-on probe, and the power-on probe is detachably fixed on the carrying mechanism to be electrically connected to the display substrate.

In an embodiment, the carrying mechanism comprises a sliding rail arranged on the base and at least one sliding block arranged on the sliding rail; the sliding block is able to move at any position on the sliding rail; and the power-on probe is fixed at a top of the sliding block to move with the sliding block along the sliding rail.

In an embodiment, a positioning structure is arranged on the sliding block, and the sliding block is fixed to the sliding rail through the positioning structure.

In an embodiment, the positioning structure comprises a third fastener and a reserved space formed on a side of the sliding block and configured to accommodate the third fastener; and the sliding block is fixed to the sliding rail by passing the third fastener through the reserved space to abut with the sliding rail.

In an embodiment, a plurality of positioning grooves are formed on the side of the sliding rail; and the sliding block is fixed to the sliding rail by passing the third fastener through the reserved space and inserting the third fastener into the positioning grooves.

In an embodiment, the plurality of positioning grooves are uniformly distributed on the side of the sliding rail.

In an embodiment, a first through hole is formed on the base. A first fastener is arranged in the first through hole; and the first fastener is pre-fixed to the base in a manner of being in interference fit with the first through hole.

In an embodiment, a second through hole configured to fix a power connector is formed on the base, the power connector is fixed to the base by mating a second fastener and the second through hole, and the power connector is configured to supply power to the power-on probe.

In an embodiment, a grab handle is arranged on the base.

In another aspect, this application provides a power-on carrying apparatus, configured to carry a power-on probe to power on a display substrate. The power-on carrying apparatus comprises:

a base, wherein a second through hole which is able to fix a power connector is formed on the base, and the power connector is fixed onto the base by virtue of the cooperation of a second fastener and the second through hole, and is configured to supply power to the power-on probe; and a carrying mechanism, arranged on the base and capable of moving relative to a power-on contact of the display substrate, wherein the carrying mechanism comprises a sliding rail arranged on the base and at least one sliding block arranged on the sliding rail, the sliding block is able to move at any position on the sliding rail, and the power-on probe is fixed at a top of the sliding block to move with the sliding block along the sliding rail, so as to enlarge an adjustment range of the power-on probe; and a positioning structure is arranged on the sliding block, and the sliding block is fixed to the sliding rail through the positioning structure, to increase an adjustment accuracy of the power-on probe.

In a further aspect, this application provides an alignment ultraviolet liquid crystal irradiation device, comprising:

an illumination apparatus, configured to emit ultraviolet lights to irradiate a display substrate; and a power-on carrying apparatus, the power-on carrying apparatus comprising a base and a carrying mechanism arranged on the base and capable of moving relative to a power-on contact of the display substrate, wherein the carrying mechanism is configured to carry a power-on probe, and the power-on probe is detachably fixed on the carrying mechanism to be electrically connected to the display substrate.

In an embodiment, the carrying mechanism comprises a sliding rail arranged on the base and at least one sliding block arranged on the sliding rail, the sliding block is able to move at any position on the sliding rail, and the power-on probe is fixed at a top of the sliding block to move with the sliding block along the sliding rail.

In an embodiment, a positioning structure is arranged on the sliding block, and the sliding block is fixed to the sliding rail through the positioning structure.

In an embodiment, the positioning structure comprises a third fastener and a reserved space formed on a side of the sliding block and configured to accommodate the third fastener, and the sliding block is fixed to the sliding rail by passing the third fastener through the reserved space to abut with the sliding rail.

In an embodiment, a plurality of positioning grooves are formed on the side of the sliding rail, and the sliding block is fixed to the sliding rail by passing the third fastener through the reserved spaces and inserting the third fastener into the positioning grooves.

In an embodiment, the plurality of positioning grooves are uniformly distributed on the side of the sliding rail.

In an embodiment, a first through hole is formed on the base, a first fastener is arranged in the first through hole, and the first fastener is pre-fixed to the base in a manner of being in interference fit with the first through hole.

In an embodiment, a second through hole configured to fix a power connector is formed on the base, the power connector is fixed to the base by mating a second fastener and the second through hole, and the power connector is configured to supply power to the power-on probe.

In an embodiment, a grab handle is arranged on the base.

In an embodiment, the alignment ultraviolet liquid crystal irradiation device further comprises:

power-on carrying platforms, configured to carry the power-on carrying apparatus, wherein the power-on carrying platforms are arranged on two sides of a display substrate carrying platform, and the power-on carrying apparatuses are fixed on the power-on carrying platforms through first fasteners. The embodiment of this application provides the power-on carrying apparatus. The power-on carrying apparatus comprises the base and the carrying mechanism arranged on the base. The carrying mechanism is able to move relative to the power-on contact of the display substrate. The power-on probe is detachably fixed on the carrying mechanism so that the power-on probe is electrically connected to the display substrate. During the replacement of the power-on carrying apparatus, only the power-on probe needs to be replaced instead of replacing the whole power-on carrying apparatus, which greatly saves the replacement time and reduces the cost. In addition, the wear during installation and removal is reduced, and the service life of the device is prolonged.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF THE EMBODIMENTS

To make objectives, technical solutions and advantages of the present invention more understandable and comprehensible, the present invention is further described in detail below with reference to accompanying drawings and embodiments. It should be understood that the embodiments herein are provided for describing the present invention and not intended to limit the present invention. It should be understood that the terms "include", "comprise", and/or variants thereof, when used in this specification and the appended claims, specify the presence of stated features, integers, steps, operations, elements, and/or components, but do not preclude the presence or addition of one or more other features, integers, steps, operations, elements, components, and/or groups thereof.

It should also be understood that the terminology used herein is for the purpose of describing particular embodiments only and is not intended to be limiting of this application. As used in this specification and the appended claims of this application, the singular forms "a", "an" and "the" are intended to include the plural forms as well, unless the context clearly indicates otherwise.

Figure 1:
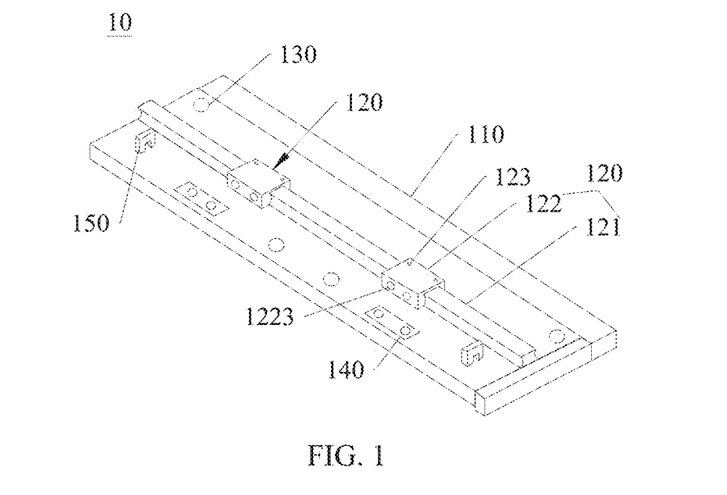
FIG. 1 is a three-dimensional structural schematic diagram of a power-on carrying apparatus according to an embodiment of this application.
Figure 2:
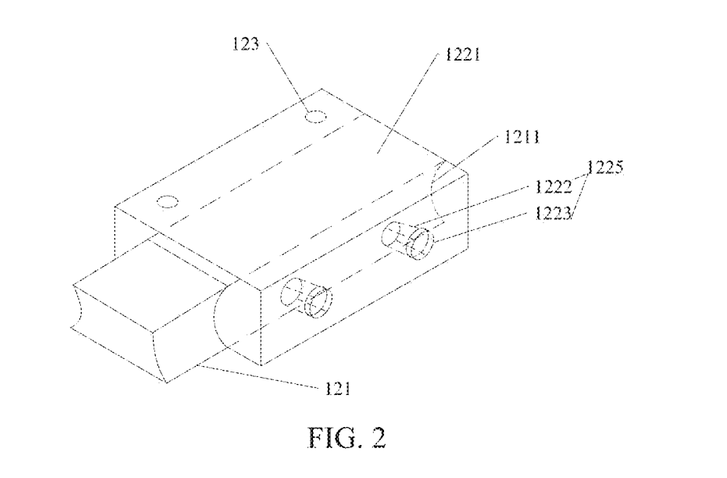
FIG. 2 is a structural schematic diagram of a carrying mechanism in a power-on carrying apparatus according to an embodiment of this application.
Figure 5:
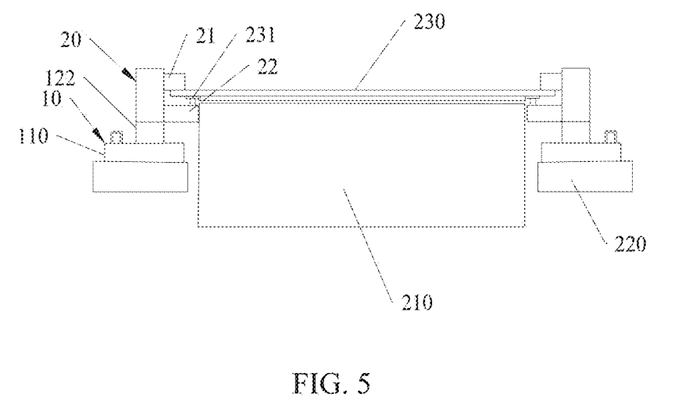
FIG. 5 is a schematic diagram of an alignment ultraviolet liquid crystal irradiation device according to another embodiment of this application.

Referring to FIG. 1, FIG. 2 and FIG. 5, an embodiment of this application discloses a power-on carrying apparatus 10. The power-on carrying apparatus 10 is configured to carry a power-on probe 20 to power on a display substrate 230. The power-on carrying apparatus 10 includes a base 110. The base 110 is provided with a carrying mechanism 120, and the carrying mechanism 120 is capable of moving relative to a power-on contact of the display substrate 230. Specifically, during actual use, the carrying mechanism 120 may be configured to carry the power-on probe 20. The power-on probe 20 is detachably fixed to the carrying mechanism 120, so that the power-on probe 20 is electrically connected to the display substrate 230. Through the above proper structural design, the power-on probe 20 is mounted on the power-on carrying apparatus 10 and forms a power-on apparatus together with the power-on carrying apparatus 10 to power on the display substrate 230. During replacement of the power-on apparatus, only the original power-on probe 20 mounted on the carrying mechanism 120 needs to be dismounted, and then a new power-on probe 20 is mounted on the carrying mechanism 120, which greatly saves the time for replacing the power-on apparatus. Furthermore, it is unnecessary to replace the whole power-on apparatus, so that the loss of the power-on apparatus during the dismounting is reduced, and the service life of the device is prolonged. In addition, it is only necessary to purchase power-on probes 20 corresponding to different product types instead of all parts in the whole power-on apparatus, which greatly reduces the cost.

In an embodiment, the display substrate 230, for example, may include an array substrate and/or a color film substrate. The array substrate includes a switch array, and the color film substrate includes a color filter. In other embodiments, the color filter and the switch array may be manufactured on the same substrate.

Figure 3:
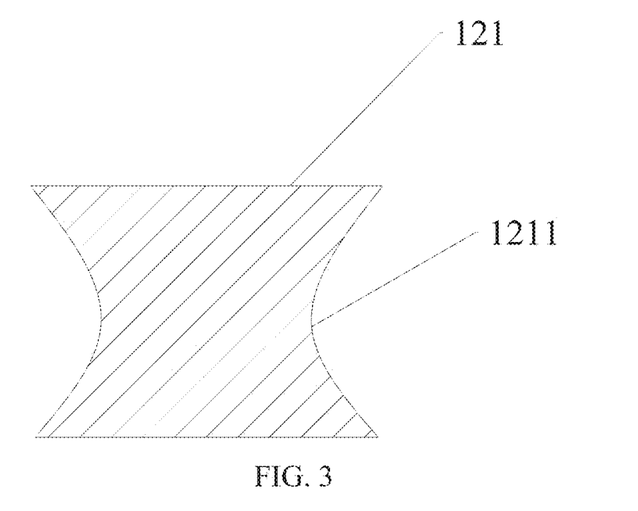
FIG. 3 is a cross-sectional schematic diagram of a sliding rail in a power-on carrying apparatus according to an embodiment of this application.

In an embodiment, for example, in the present embodiment, the carrying mechanism 120 includes a sliding rail 121 arranged on the base 110 and at least one sliding block 122 arranged on the sliding rail. The sliding rail 121 is arranged at a middle position of the base 110. The sliding rail 121 has a length that is equal to that of the base 110. Furthermore, the sliding rail 121 divides the base 110 into a front side, a rear side, a left side and a right side. Two ends in the lengthwise direction of the sliding rail 121 respectively correspond to the left side and the right side of the base 110, and two sides of the base 110 along a direction perpendicular to the lengthwise direction of the sliding rail 121 are respectively the front side and the rear side of the base. A channel 1221 having the same cross sectional shape as that of the sliding rail 121 is formed in a bottom of the sliding block 122. The cross section of the sliding rail 121 is a quadrangle having one pair of inwards sunken opposite side edges and another pair of parallel opposite side edges. The edges of the quadrangle may be straight lines or curved lines. The cross section of the sliding rail also may be of other shapes having one pair of inwards sunken opposite side edges as long as the sliding block 122 is limited in a height direction of the base 110, that is, when the sliding block 122 moves, a height difference between the sliding block 122 and the base 110 is kept unchanged. As shown in FIG. 3, one pair of the opposite side edges of the sliding rail 121 form a groove 1211, so as to allow the sliding rail 121 to pass through the formed channel 1221 of the sliding block 122. Thanks to the design of the sunken structures of the two sides of the sliding rail 121, the sliding block 122 is clamped to the sliding rail 121. The sliding block 122 may only move along the lengthwise direction of the sliding rail 121 and is limited on the sliding rail 121. Atop of the sliding block 122 is provided with a fixing position 123 capable of fixing the power-on probe 20. The power-on probe 20 is fixed at the top of the sliding block 122 through the fixing position 123, so that the power-on probe 20 moves with the sliding block 122 along the sliding rail 121, thereby enlarging the range of adjusting the position of the power-on probe 20. In one embodiment, two sliding blocks 122 are arranged on one sliding rail 121. The number of the sliding block 122 is matched with that of the power-on probe 20, and the number of the power-on probe 20 may be set according to an actual requirement.

In an embodiment, for example, in the present embodiment, a positioning structure 1225 is arranged on the sliding block 122, and the positioning structure 1225 includes a third fastener 1223 and a reserved space 1222 formed on a side of the sliding block 122 and configured to accommodate the third fastener. Specifically, the positioning structure 1225 on the side of the sliding block 122 is arranged back on to a power-on side of the power-on probe 20, namely the rear side of the base 110, so as to facilitate the power-on adjustment by an operator. In one embodiment, for example, in the present embodiment, the third fastener 1223 is a screw. The screw passes through the reserved space 1222 in the side of the sliding block 122. The sliding block 122 is fixed to the sliding rail 121 by screwing the screw and pushing the sliding block 122 to abut with the sliding rail 121. The power-on probe 20 is fixed at the top of the sliding block 122 and moves with the sliding block 122, and the sliding block 122 may be fixed at any position on the sliding rail 121 through the third fastener 1223, so that the relative position of the power-on probe 20 and the display substrate 230 may be randomly adjusted and then fixed, thereby increasing the adjustment accuracy of the power-on probe 20 and improving the stability of electric connection between the power-on probe 20 and the display substrate 230.

In an embodiment, for example, in the present embodiment, a first through hole 130 is formed on the base 110, and a first fastener is arranged in the first through hole 130. The first fastener is pre-fixed in the base 110 in a manner of being in interference fit with the first through hole 130, so that the first fastener is integrated into the base 110, and thus the power-on carrying apparatus 10 may be conveniently mounted onto an alignment ultraviolet liquid crystal irradiation device in the later stage. Specifically, in an embodiment, totally four first through holes 130 are formed on the base 110. In other embodiments, the number of the first through hole 130 also may be any other number as long as the base 110 may be fixed, and a top surface of a screw cap of the mounted first fastener is flush with a top surface of the base 110.

In an embodiment, for example, in the present embodiment, a second through hole 140 configured to fix a power connector (not shown in the figures) is formed on the base 110. The power connector is fixed to the base 110 by virtue of the cooperation of a second fastener (not shown in the figures) and the second through hole 140, and is configured to supply power to the power-on probe 20. Specifically, the power connector is connected with the power-on probe 20 through a lead wire to supply power to the power-on probe 20. In the present embodiment, one power connector is matched with two second through holes 140, and thus is fixed through two second fasteners. The number of the power connector is matched with that of the power-on probe 20, that is, one power connector corresponds to one power-on probe 20 to supply power to the power-on probe 20. The specific number of the power connector may be set according to the number of the power-on probe 20.

In one embodiment, for example, in the present embodiment, a grab handle 150 is arranged on the base 110, the grab handle 150 is annular, mounted on a surface of the base 110, and configured to facilitate the grabbing of the base 110 for ease of operation. There are two grab handles 150, the two grab handles 150 are respectively arranged on the left side and the right side of the base 110. The grab handles 150 and the power connector are all arranged back on to the power-on side of the power-on probe 20, namely on the rear side of the base 110, so as to avoid disturbing the powering on of the power-on probe 20.

Through the above proper structural design, the power-on probe 20 is mounted on the power-on carrying apparatus 10 and forms a power-on apparatus together with the power-on carrying apparatus 10 to power on the display substrate 230. During replacement of the power-on apparatus, only the original power-on probe 20 needs to be dismounted to replace a new power-on probe 20, and then the power connector configured to supply power to the power-on probe 20 is replaced, which saves the time of replacement. The power-on probe 20 is detachable on the sliding block 122 and may move relative to the power-on contact of the display substrate 230, so that except the power-on probe 20 and the power connector, the rest part, namely the power-on carrying apparatus 10, of the power-on apparatus does not require to be replaced, and then it is unnecessary to purchase the rest part, which avoids repeated purchase of the same non-replacement part and greatly reduces the cost of the apparatus. Furthermore, the rest part is directly fixed to a carrying table of the power-on carrying apparatus instead of being removed and installed at each time of replacement, which reduces the wear during removal and installation and thus prolongs the service life of the apparatus. During the operation of confirming a power-on point location, the position of the power-on probe 20 may be adjusted by moving the sliding block 122 or screwing the third fastener 1223 to allow the power-on probe 20 to be in full contact with a power-on terminal 231 on the display substrate 230 to power on the display substrate 230, so as to improve the flexibility of the power-on probe 20.

In the power-on carrying apparatus provided by an embodiment of this application, by arranging the carrying mechanism capable of moving relative to the power-on contact of the display substrate on the base, the power-on probe is detachably fixed on the carrying mechanism, so that the power-on probe is electrically connected to the display substrate. During the replacement of the power-on apparatus, only the power-on probe needs to be replaced instead of replacing the power-on carrying apparatus, which greatly saves the replacement time and reduces the cost. In addition, the wear during installation and removal is reduced, and the service life of the device is prolonged.

Figure 4:
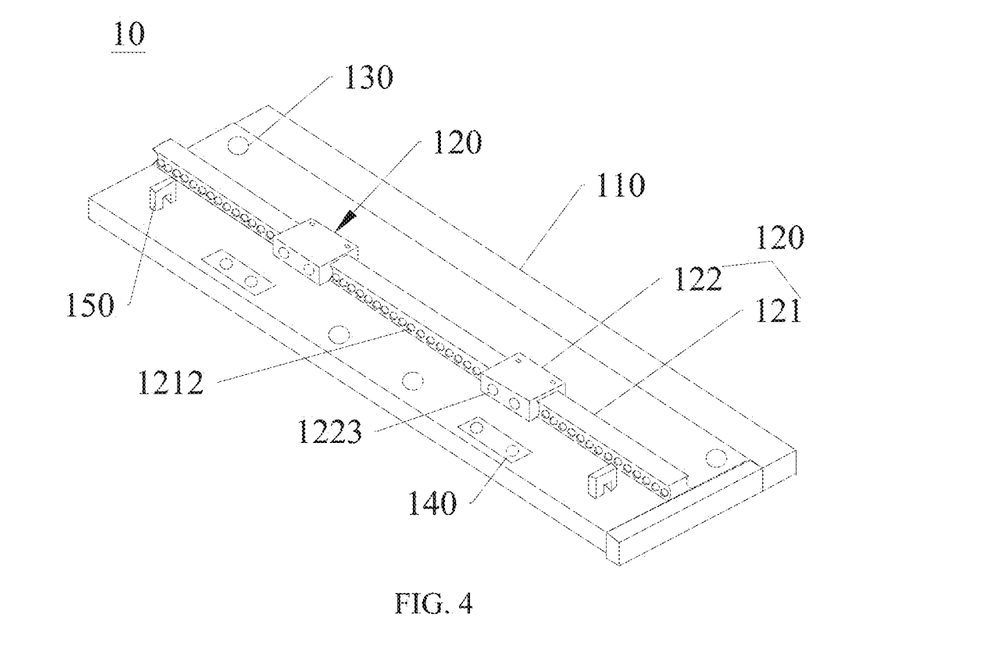
FIG. 4 is a three-dimensional structural schematic diagram of a power-on carrying apparatus according to another embodiment of this application.

Referring to FIG. 4, it shows a power-on carrying apparatus of another embodiment of this application. The structure of the carrying apparatus is the same as that of the carrying apparatus of the foregoing embodiment. A difference lies in that in the positioning structure, the sliding block 122 and the sliding rail 121 are fixed in another manner. In the present embodiment, a plurality of positioning grooves 1212 are formed on the side of the sliding rail 121. The sliding block 122 is fixed on the sliding rail 121 by passing the third fastener 1223 through the reserved space 1222 and inserting the third fastener 1223 into the positioning grooves 1212. The plurality of positioning grooves 1212 are uniformly distributed on the side of the sliding rail 121. Through the above proper structural design, the proper positioning grooves 1212 may be selected according to the position of an actual power-on point location to fix the sliding block 122 onto the sliding rail 121 through the third fastener 1223, so as to confirm the power-on point location.

Figure 6:
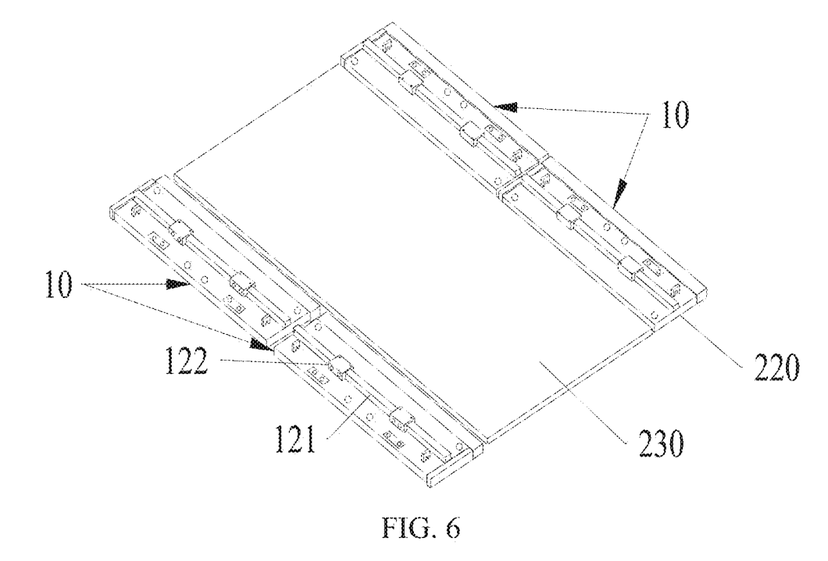
FIG. 6 is another schematic diagram of an alignment ultraviolet liquid crystal irradiation device according to still another embodiment of this application.
Figure 7:
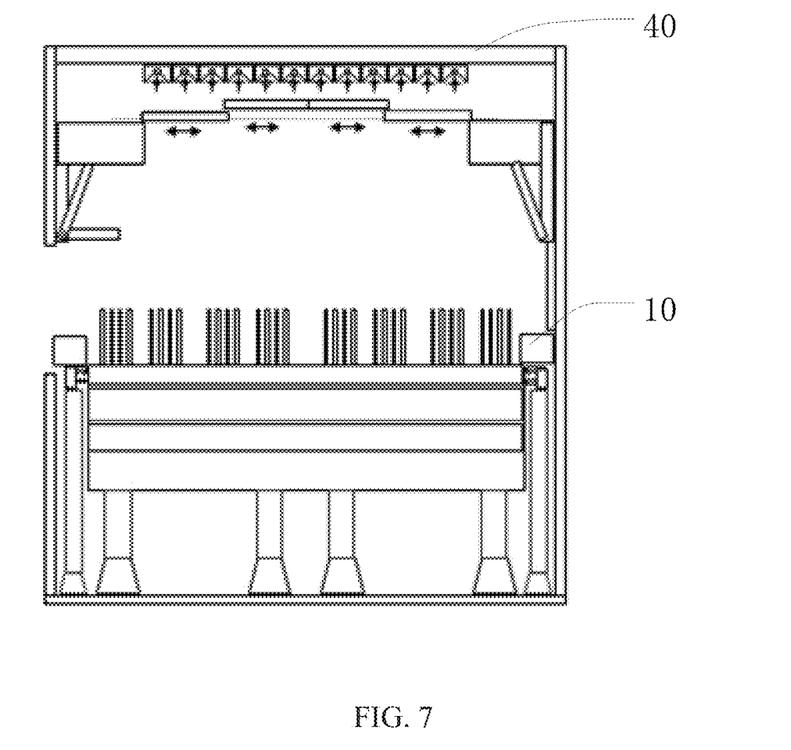
FIG. 7 is a further schematic diagram of an alignment ultraviolet liquid crystal irradiation device according to an embodiment of this application.

Referring to FIG. 5, FIG. 6 and FIG. 7, each figure shows an alignment ultraviolet liquid crystal irradiation device according to an embodiment of this application. The alignment ultraviolet liquid crystal irradiation device includes power-on carrying apparatuses 10 and an illumination apparatus 40. The illumination apparatus 40 is configured to emit ultraviolet lights to irradiate a display substrate. Each of the power-on carrying apparatuses 10 is the power-on carrying apparatus 10 described in the foregoing embodiment. The alignment ultraviolet liquid crystal irradiation device further includes power-on carrying platforms 220 configured to carry the power-on carrying apparatuses 10 and a display substrate carrying platform 210 configured to carry the display substrate 230. The power-on carrying platforms 220 are arranged on two sides of the display substrate carrying platform 210. The power-on carrying apparatuses 10 are fixed on the carrying platforms for the power-on carrying apparatuses 10 through the first fastener. The structure of each power-on probe 20 is equivalent to a clamping mechanism. Needling points of the power-on probes 20 are located at a lower half part 22 of the clamping mechanism. During powering on, a upper half parts 21 and the lower half part 22 of the clamping mechanisms are matched to clamp the display substrate 230, and the needling points abut against a power-on terminal 231 of the display substrate 230 and are in contact with the power-on terminal 231. Specifically, the power-on probes 20 on the two sides are in contact with the power-on terminal 231 on the display substrate 230 for powering on, and the contact positions of the power-on probes 20 are adjusted by sliding the sliding blocks 122 and adjusting the third fasteners 1223, so as to confirm the power-on point location. In a space rectangular coordinate system, the sliding rail 121 serves as an X axis. As the whole carrying platform may move on a Y axis and a Z axis which are perpendicular to the sliding rail 121 to allow the sliding block 122 to move on the sliding rail 121 and directions perpendicular to the sliding rail 121, the flexibility of the sliding block 122 is greatly improved. The bases 110 are fixed on the power-on carrying platforms 220 and are integrated with the power-on carrying platforms 220, so that in the later replacement of power-on apparatuses, it is unnecessary to replace the whole power-on apparatuses. That is, in the present embodiment, during the replacement of a power-on apparatus, it is unnecessary to replace the whole power-on apparatus, but only the power-on probe 20 on the power-on carrying apparatus 10 and the power connector corresponding to the power-on probe 20 need to be replaced, which greatly saves the replacement time, avoids repeated purchasing and reduces the cost. In addition, the wear during installation and removal is reduced, and the service life of the device is prolonged.

In the alignment ultraviolet liquid crystal irradiation device according to an embodiment of this application, through the proper structural design, during the replacement of the power-on apparatus, only the power-on probe and the power connector configured to supply power to the power-on probe need to be replaced, which greatly saves the replacement time. Furthermore, the design of the power-on probe is more flexible, the adjustment range of the power-on probe is enlarged, and the adjustment accuracy of the power-on probe is increased.

It should be noted that the alignment ultraviolet liquid crystal irradiation device according to an embodiment of this application further includes other structures to implement the basic functions of the alignment ultraviolet liquid crystal irradiation device. These structures are all familiar in the art, so that no more details will be described here.

Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification. The foregoing embodiments are merely several implementations of the present invention, which are described in a relatively specific and detailed manner. However, this should not be constructed as a limitation to the scope of this application. It should be noted that, a person of ordinary skill in the art may make various changes and improvements without departing from the ideas of this application, which shall all fall within the protection scope of this application. Therefore, the protection scope of this application shall be subject to the appended claims.

What is claimed is:

1. A power-on carrying apparatus, configured to carry a power-on probe to power on a display substrate, the power-on carrying apparatus comprising:
a base; and
a carrying mechanism, arranged on the base and capable of moving relative to a power-on contact of the display substrate, the carrying mechanism comprising a sliding rail arranged on the base and at least one sliding block arranged on the sliding rail, the at least one sliding block able to move at any position on the sliding rail;
a positioning structure arranged on the at least one sliding block, the at least one sliding block fixed to the sliding rail through the positioning structure, the positioning structure comprising a third fastener and a reserved space formed on a side of the at least one sliding block, the reserved space configured to accommodate the third fastener, the at least one sliding block fixed to the sliding rail by passing the third fastener through the reserved space to abut with the sliding rail; and
a plurality of positioning grooves formed on a side of the sliding rail, wherein the at least one sliding block is fixed to the sliding rail by passing the third fastener through the reserved space and inserting the third fastener into the positioning grooves;
wherein the carrying mechanism is able to carry the power-on probe, and the power-on probe is detachably fixed on the carrying mechanism to be electrically connected to the display substrate;
wherein the power-on probe fixed at a top of the at least one sliding block to move with the at least one sliding block along the sliding rail; and
wherein the sliding block is clamped to the sliding rail because of a sunken structure of the two sides of the sliding rail, the sliding block is only moveable along the lengthwise direction of the sliding rail such that changing a height difference between the sliding block and the base is limited as the sliding block moves.

2. The power-on carrying apparatus according to claim 1, wherein a first through hole is formed on the base, a first fastener is arranged in the first through hole, and the first fastener is pre-fixed to the base in a manner of being in interference fit with the first through hole.

3. The power-on carrying apparatus according to claim 1, wherein the plurality of positioning grooves are uniformly distributed on the side of the sliding rail.

4. The power-on carrying apparatus according to claim 1, wherein the base includes a second through hole configured to fix a power connector, the power connector is fixed to the base by mating a second fastener and the second through hole, and the power connector is configured to supply power to the power-on probe.

5. The power-on carrying apparatus according to claim 1, further comprising a grab handle arranged on the base.

6. An alignment ultraviolet liquid crystal irradiation device, comprising:
an illumination apparatus, configured to emit ultraviolet light to irradiate a display substrate; and
a power-on carrying apparatus, the power-on carrying apparatus comprising:
a base;
a carrying mechanism arranged on the base and capable of moving relative to a power-on contact of the display substrate, the carrying mechanism comprising a sliding rail arranged on the base and at least one sliding block arranged on the at least one sliding rail, the at least one sliding block is able to move at any position on the sliding rail;
a positioning structure arranged on the at least one sliding block, the at least one sliding block fixed to the sliding rail through the positioning structure, the positioning structure comprising a third fastener and a reserved space formed on a side of the sliding block, the reserved space configured to accommodate the third fastener, the at least one sliding block fixed to the sliding rail by passing the third fastener through the reserved space to abut with the sliding rail; and
a plurality of positioning grooves are formed on a side of the sliding rail, wherein the at least one sliding block is fixed to the sliding rail by passing the third fastener through the reserved space and inserting the third fastener into the positioning grooves;
wherein the carrying mechanism is configured to carry a power-on probe, and the power-on probe is detachably fixed on the carrying mechanism to be electrically connected to the display substrate;
wherein the power-on probe is fixed at a top of the at least one sliding block to move with the at least one sliding block along the sliding rail; and
wherein the sliding block is clamped to the sliding rail because of a sunken structure of the two sides of the sliding rail, the sliding block is only moveable along the lengthwise direction of the sliding rail such that changing a height difference between the sliding block and the base is limited as the sliding block moves.

7. The alignment ultraviolet liquid crystal irradiation device according to claim 6, wherein a first through hole is formed on the base, a first fastener is arranged in the first through hole, and the first fastener is pre-fixed to the base in a manner of being in interference fit with the first through hole.

8. The alignment ultraviolet liquid crystal irradiation device according to claim 6, wherein the plurality of positioning grooves are uniformly distributed on the side of the sliding rail.

9. The alignment ultraviolet liquid crystal irradiation device according to claim 6, wherein the base includes a second through hole configured to fix a power connector, the power connector is fixed to the base by mating a second fastener and the second through hole, and the power connector is configured to supply power to the power-on probe.

10. The alignment ultraviolet liquid crystal irradiation device according to claim 6, wherein a grab handle is arranged on the base.

11. The alignment ultraviolet liquid crystal irradiation device according to claim 6, further comprising:
power-on carrying platforms, configured to carry the power-on carrying apparatus, wherein the power-on carrying platforms are arranged on two sides of a display substrate carrying platform, and the power-on carrying apparatus is fixed on the power-on carrying platforms through first fasteners.

* * * * *